No. 705,947. Patented July 29, 1902.
W. L. MOORE.
AIR COOLING, DRYING, AND PURIFYING APPARATUS.
(Application filed May 29, 1902.)
(No Model.) 2 Sheets—Sheet I.
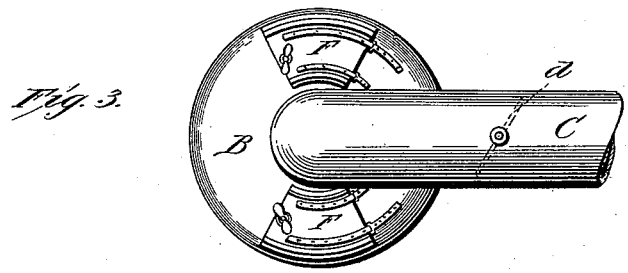
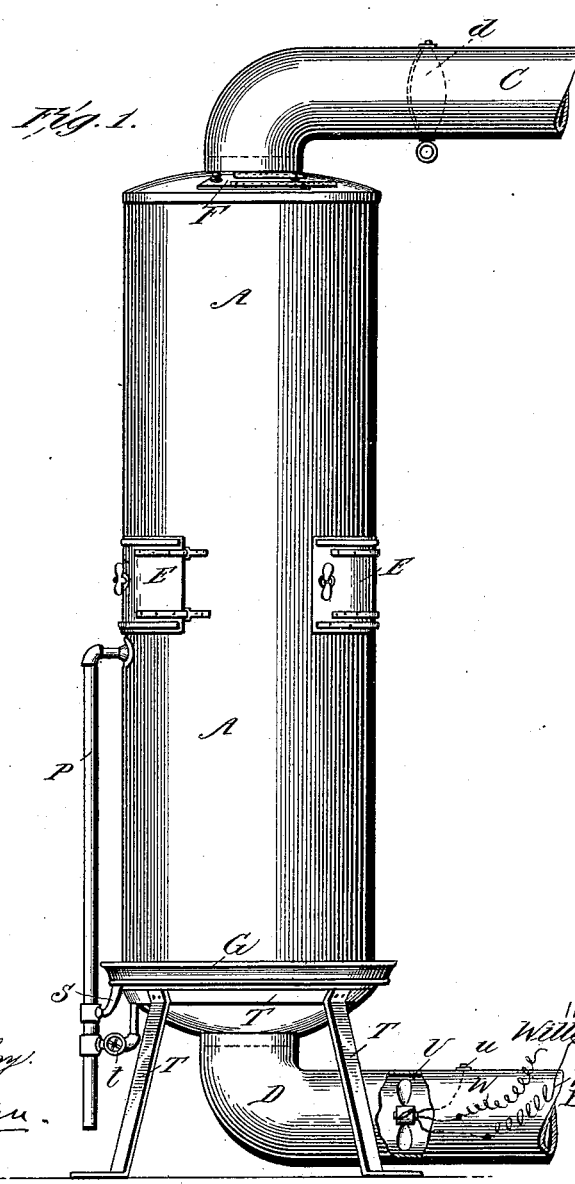

No. 705,947. Patented July 29, 1902.
W. L. MOORE.
AIR COOLING, DRYING, AND PURIFYING APPARATUS.
(Application filed May 29, 1902.)
(No Model.) 2 Sheets—Sheet 2.
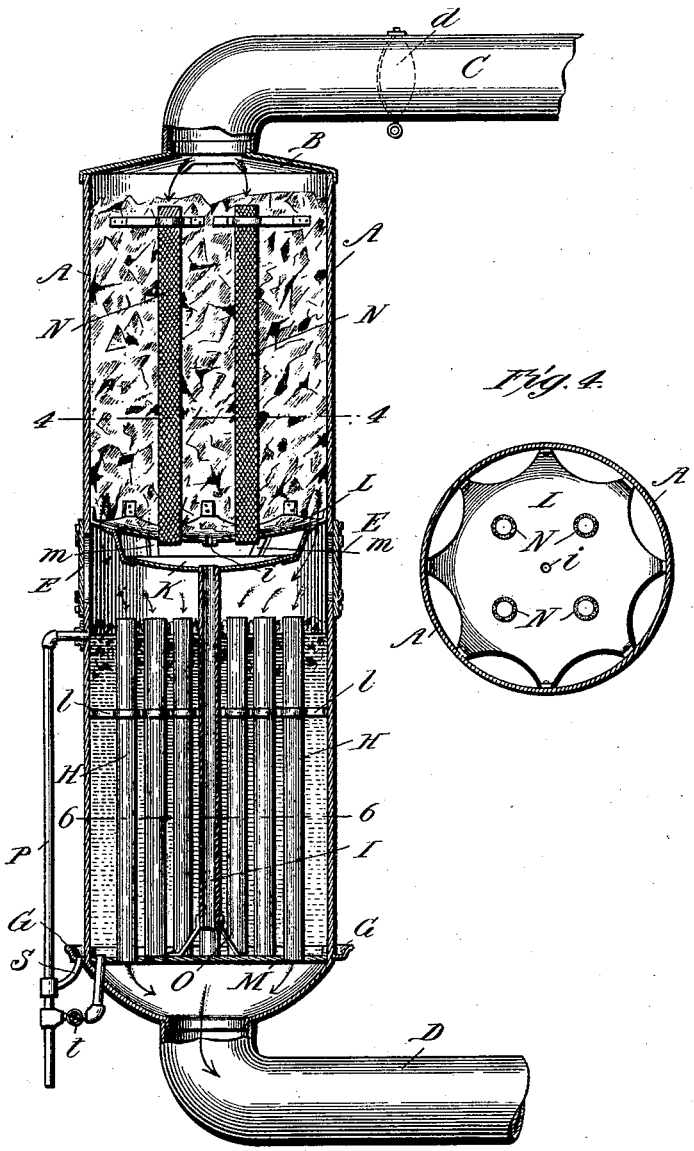
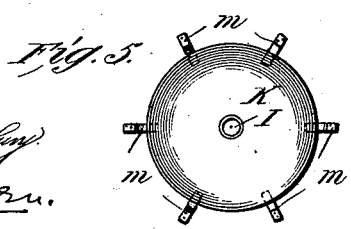
WITNESSES:
INVENTOR
Willis. L. Moore.
BY
ATTORNEYS.

UNITED STATES PATENT OFFICE.

WILLIS LUTHER MOORE, OF WASHINGTON, DISTRICT OF COLUMBIA.

AIR COOLING, DRYING, AND PURIFYING APPARATUS.

SPECIFICATION forming part of Letters Patent No. 705,947, dated July 29, 1902.

Application filed May 29, 1902. Serial No. 109,497. (No model.)

*To all whom it may concern:*

Be it known that I, WILLIS LUTHER MOORE, a citizen of the United States, residing in Washington, District of Columbia, have invented certain new and useful Improvements in Air Cooling, Drying, and Purifying Apparatus; and I do hereby declare that the following is a full, clear, and exact description of the invention, which will enable others to make and use the same, reference being had to the accompanying drawings, and to the letters of reference marked thereon, which form a part of this specification.

The object of my invention is to provide an apparatus to be used for cooling, drying, and purifying the air in dwelling-houses, railway - coaches, hospitals, theaters, hotels, apartment-houses, and other places and for the keeping of meats, produce, or anything that requires a low temperature which shall partly or wholly take in air from the outside of a building or apartment, bring the air in contact with melting ice for the purpose of lowering its temperature, and by the surface attraction or tension of the water on the exterior of the melting ice extract the dust from the air and by reducing the temperature of the air much below its initial temperature (probably nearly to that of melting ice) precipitate the greater part of its moisture, and thereby render it dry, as well as cool and pure, then to pass the air through metal pipes which are surrounded by melting ice and chlorid of sodium, chlorid of calcium, or other chemical or mixtures to lower the melting-point of ice and then as the air passes down through these pipes cause it to lose more of its heat and finally by gravity to be discharged from the bottom of the apparatus into the lower part of the room to be cooled. If need be, the discharge of the air through the machine is accelerated by the action of a suction or a force fan.

I am aware that methods and apparatus for cooling and drying air by the use of ice or ice and some salt have been used before; but my invention comprehends a certain novel construction and arrangement of apparatus whereby a more efficient and economical method is made available for accomplishing this object, as will be hereinafter more fully described with reference to the drawings, in which—

Figure 1 is a side elevation. Fig. 2 is a vertical section of the entire apparatus. Fig. 3 is a top view. Fig. 4 is a horizontal section on line 4 4 of Fig. 2 looking down and showing the intermediate bottom L. Fig. 5 is a top view of drip-pan located immediately under intermediate bottom L. Fig. 6 is a horizontal section on the line 6 6 of Fig. 2 looking down upon bottom M.

In the drawings the reference-letter A indicates the outer shell or casing of the cooling apparatus, which is upheld by legs and rim T T and which may be either cylindrical or rectangular. It is preferred to make this shell of some metal that freely conducts heat, like copper, because the apparatus usually will be placed in the room or apartment to be cooled, and the warm humid air of the room coming in contact with the cold surface of the shell will precipitate moisture on the outside, which moisture will be collected at the bottom by trough G and discharged through pipe S into the waste and overflow pipe P. All of the interior of the shell or cylinder A except that occupied by apparatus and the space between the tops of pipes H and the bottom of drip-pan K may be filled with ice or ice mixed with chlorid of sodium or ice mixed with chlorid of calcium or other freezing mixtures, and when worked to its full capacity all this space will be filled with ice or ice and salt.

B is a top to fit upon the cylinder A. It may be rigidly attached or it may be movable.

F F are doors in the top of the cylinder to admit ice and salt to the upper half of the cylinder A.

E E are doors in the sides of the cylinder A, through which ice and salt are admitted to the lower half of said cylinder.

N N are tubes or cylinders of woven-wire or perforated or reticulated material to facilitate the flow of air through the broken ice and the diffusion of the air laterally through the ice. Fig. 4 shows the location of four of such wire-mesh tubes; but I do not limit myself to any number.

The tendency of broken or granulated ice is when melting to cake together and cohere in a solid mass, which eliminates interstitial spaces and precludes the proper diffusion of air through the mass and also retards and eventually wholly obstructs its circulation and flow, especially when its downward movement by gravity alone is relied upon. These reticulated tubes or cylinders always maintain passage-ways for the air through the ice, and as the ice melts the woven-wire mesh becomes embedded in the ice as in a matrix, and thus both holds the ice up against gravitating into a cake at the bottom and also allows lateral diffusion of air through the tubes into the interstices of the ice, thus maintaining the flow of air and greatly increasing the cooling effect.

L shows the intermediate bottom with scalloped edges fastened to the sides of the cylinder A. It has a central outlet at $i$, where the water escapes through the intermediate bottom into the subjacent drip-pan K. I is a pipe connected to the center of this drip-pan, through which pipe the drip-water from the ice above is conducted and is discharged near the bottom of the cylinder A, the object being to keep the greatest degree of cold near the bottom of the cylinder, so that as the air falls by gravity it shall continually encounter regions having a lower temperature than its own, and thereby continue to lose heat until it leaves the bottom of the cylinder and enters the room. The reason for having a drip-pan under the intermediate bottom is that ice may lodge in the open spaces around the sides of the intermediate bottom through which the air passes to the lower half of the cylinder and melting there allows the water to adhere to and run down to near the center of the bottom of the intermediate bottom, and if it were not for the drip-pan this water might drip into the open ends of the pipes H. The function, therefore, of the drip-pan is to protect the open ends of the pipes H H.

$m$ $m$ are metal strips that secure the drip-pan to the intermediate bottom L, and $l$ designates stay-braces for the pipes H. O is the three-legged support, upon which rests the drip-pipe I.

H H are thin copper pipes that receive the air after it passes the intermediate bottom. These pipes are open at both top and bottom, and it is the intention to surround them with broken ice and some salt, that lowers the melting-point of ice, mixed with the ice-water that drips from the ice in the upper part of the shell A. I do not limit myself to the use of ice alone in this upper part of the shell, as some salt may be mixed with the ice, in which case the drip would be in the form of brine. By breaking the ice finer and combining with it a considerable quantity of chlorid of sodium or chlorid of calcium or other chemical that lowers the melting-point of ice it is the purpose to maintain a lower temperature in the lower half of the shell A than in the upper half, so that the air, which in its passage through the upper half of the shell has been somewhat cooled and very considerably dried, may now by passing into the pipes H be still further cooled and dried. It is an important matter that the air be first brought into contact with the ice, so that it may part with its dust to the film of water surrounding each piece of the melting ice and so that, in addition to having its temperature somewhat lowered, it may part with so much of its moisture by condensation upon the cold ice that when it reaches the copper pipes H in the lower half of the cylinder the remaining moisture shall not by condensation in the copper pipes H be sufficient to obstruct the same.

M is the bottom of the cylinder A, into which are fitted the lower ends of the pipes H in such manner that the air that enters the tops of the pipes may be discharged through the bottom M and into the large pipe D, which conducts the air to the room or apartment to be cooled. The pipes H must be water-tight, especially where they are fitted to the bottom M.

It will be seen that by means of the overflow-pipe P the water is trapped in the lower compartment, but may be drained away by a pipe at the bottom having a valve $t$ discharging into the waste-pipe.

The air in passing through the cylinder A has its temperature rapidly lowered and as a consequence its specific gravity increased. This causes it to fall and to gain in the rapidity of its fall as it cools and descends. Hence the apparatus when charged will, by the action of gravity alone, take in air from the outside, wash it free of dust, cool and dry it, and discharge it into the room or apartment to be cooled, and preferably into the lower portion, so that pure and cool air may accumulate in a lower stratum in the room, and thus reach the persons or things without being contaminated or rendered less effective by the warmer and less pure air near the top of the room or compartment, or in case it is desired to cool and dry over and over again the air of the room or apartment a damper $d$ in the inlet-pipe C may be turned, which will shut off the inflow of air from the outside, and when the doors F F are opened the machine will use over and over again the same air from the room or apartment. This may be done when the machine is used for refrigerating purposes in the preservation of meat, vegetables, manufactured or other articles that require extremely low temperatures, or it may be done when, on account of the large space to be cooled, but little ventilation is desired, or the damper $d$ may be only partly opened, so as to permit a portion of the air to come from the outside and a portion to be taken from the top of the room through a partly-opened door in the top of the shell. When the temperature or the humidity, or both, are so high that the apparatus acting alone under the influence of gravity does not give a sufficient degree of cold, or when an extremely low temperature is desired for refrigerating or other purpose, or when the space to be cooled is of greater dimensions than can be cooled by the machine acting under gravity, then an electric suction-fan U, which is started by the button *u* and operated by a current on the wires W W, may be used for the purpose of drawing the air through the apparatus and discharging it into the room or apartment.

In distinguishing my invention more clearly I would state that I am aware that an air-cooling apparatus has been provided with an upper ice-compartment and a lower meltage-compartment, in which latter were immersed air-circulation pipes in horizontal coils designed to have the air forced upwardly through the same by a fan. I am also aware that an upper ice-compartment and subjacent meltage-compartment have had a vertical inlet air-pipe extended through the same, taking air at the top and discharging it in thin streams directly into contact with the water and then rising through the water and the ice. Both such plans antagonize the natural flow of cold air from gravity and require forcing apparatus, which in most houses is not available. The main feature of my invention is a construction which utilizes the downflow of cold air from convection and requires no forcing apparatus, whereby it is made universally applicable without the use of motive power, and as a leading feature of my construction I would especially call attention to the vertical pipes in the subjacent meltage-chamber opening at their upper ends below the superposed ice-chamber and also the vertical reticulated or perforated pipes in the ice-chamber above, open at their upper ends and forming air-conduits, whereby the downward movement of air from gravity is permitted and whereby also a lower temperature in the meltage-chamber is obtained than in the ice-chamber above, which causes the air to be progressively cooled to a lower temperature as it descends and to be thereby progressively dried and progressively energized in its descent from convection.

What I claim as new, and desire to secure by Letters Patent, is—

1. In an air-cooling apparatus, the combination of an ice-compartment, reticulated tubes extending through the same for diffusing air through the ice; an intermediate bottom for sustaining the ice in the upper compartment, a drip-pan for catching the flow of water from the intermediate bottom; a discharge-pipe for conducting the drip-water from the upper compartment to the bottom of the lower compartment; a second ice-compartment immediately below the first for the reception of ice and some chemical that lowers the melting point of ice, tubes arranged in the lower compartment for the passage of air through the same, a suction-fan to energize the operation of the machine, a damper to regulate the flow of air into the top of the shell, and a trough encircling the shell to catch the moisture that may condense on the outside of the shell.

2. A two-compartment air-cooling apparatus having ice-sustaining devices for the upper compartment with vertical reticulated or perforated tubes through the same, open at their upper ends, vertical pipes in the lower compartment opening at their upper ends below the ice-chamber, and means for maintaining the level of the meltage-water in the lower compartment below the level of the upper ends of the vertical air-pipes substantially as described.

3. An air-cooling apparatus comprising a casing, an intermediate bottom with openings through its edges next the casing, reticulated or perforated tubes arranged in the upper compartment, a drip-pan arranged below the intermediate bottom and having a drain-pipe leading into the lower compartment, air-tubes arranged in the lower compartment and opening below and protected by the drip-pan, and opening at their lower ends through the lower compartment, an overflow tapped into the lower compartment below the level of the upper ends of said air-tubes, and a drain-pipe tapped into the lower part of the lower compartment and also into the overflow-pipe and having a cut-off valve, and an external trough for the bottom of the casing also tapped into the overflow-pipe substantially as shown and described.

4. A two-compartment air-cooling apparatus having ice-sustaining devices for the upper compartment, a drip-pan arranged beneath the same and having central discharge-pipe leading to the lower compartment, vertical pipes in the lower compartment arranged about the drip-discharge pipe and opening at their upper ends below the drip-pan, and means for maintaining the level of the meltage-water in the lower compartment below the level of the upper ends of the vertical air-pipes in the lower compartment substantially as described.

5. An air-cooling apparatus having an ice-chamber with an intermediate bottom or diaphragm having openings through it around its outer edges and a central drainage-hole, a subjacent drip-pan, and vertical tubes of reticulated or perforated material open at their upper ends and arranged in said intermediate bottom and opening through the same and above said drip-pan substantially as described.

6. An air-cooling apparatus made in two compartments, the upper compartment having an intermediate bottom or supporting-diaphragm for ice with openings through it, and a subjacent drip-pan with central discharge-pipe, vertical tubes in the lower compartment surrounding the central drip-discharge pipe and opening at their upper ends into the lower compartment below the drip-pan and covered by the same to exclude drip-water from the tubes substantially as described.

7. An air-cooling apparatus made in two compartments, the upper compartment having an intermediate bottom or supporting-diaphragm for ice with openings through it, a subjacent drip-pan with central discharge-pipe, a series of vertical pipes in the lower compartment surrounding the drip-discharge pipe and opening at their upper ends below the drip-pan and covered by the same to exclude drip-water, and an overflow-pipe tapped into the lower compartment at a point below the upper ends of said pipes substantially as described.

8. An air-cooling apparatus having two compartments, one above the other, the upper one having means for holding the ice in it and open-meshed or perforated tubes through it opening at their upper ends into the top of the upper compartment and at their bottoms into the top of the lower compartment, the lower compartment being made as a trapped chamber and having vertical air-pipes through it opening at their upper ends below the upper compartment and adapted to receive a freezing mixture to produce a lower temperature than in the upper compartment substantially as described.

9. A two-compartment air-cooling apparatus consisting of an upright cylinder having ice-sustaining devices for the upper compartment, vertical pipes in the lower compartment opening at their upper ends below the ice-sustaining devices with a free space between said upper ends of the pipes and the ice-sustaining devices above, and doors arranged in the sides of the cylinder at an intermediate point of the cylinder opposite said free space to permit the introduction of a freezing mixture in the lower compartment substantially as shown and described.

10. A two-compartment air-cooling apparatus having ice-sustaining devices for the upper compartment, and an air-space below said ice-sustaining devices, a series of vertical pipes arranged in the lower compartment and opening at their upper ends into the lower portion of the air-space below the ice-sustaining devices, means for trapping the meltage-water around the vertical pipes of the lower compartment without overflowing into said pipes and an air-discharge conduit communicating with the bottom ends of said vertical air-pipes substantially as described.

WILLIS LUTHER MOORE.

Witnesses:
EDW. W. BYRN,
SOLON C. KEMON.